July 3, 1962
R. A. SNEDDON
3,042,360
VIBRATORY CONVEYOR DISCHARGE GATE
Filed Oct. 25, 1957
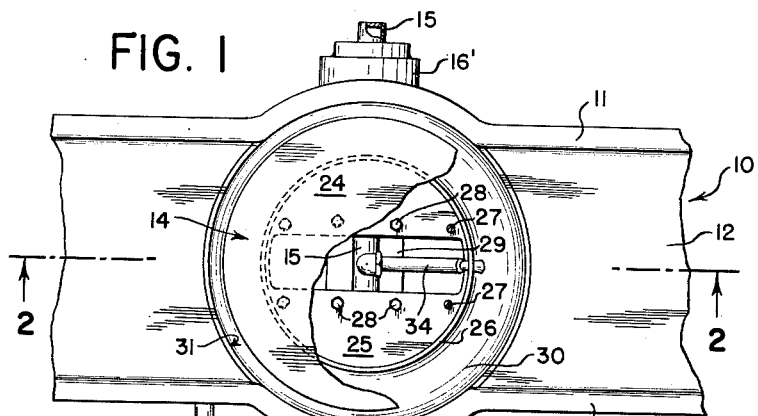
FIG. 1
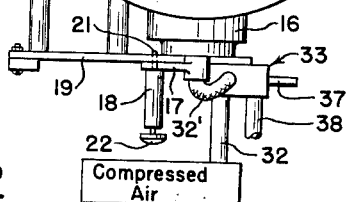
FIG. 2
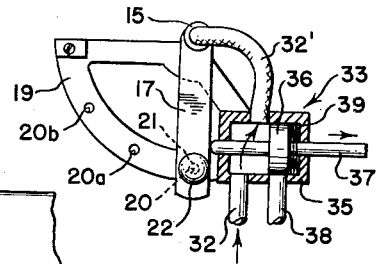
FIG. 4
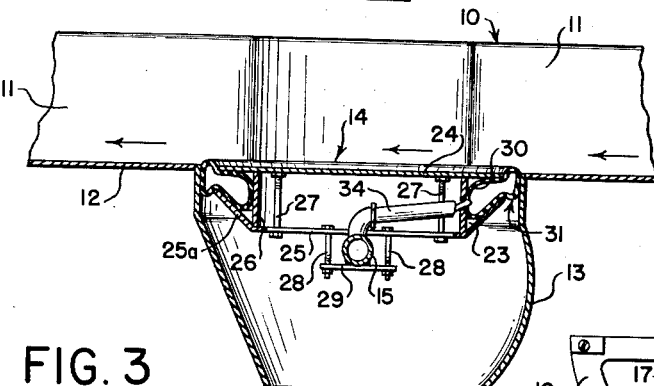
FIG. 3
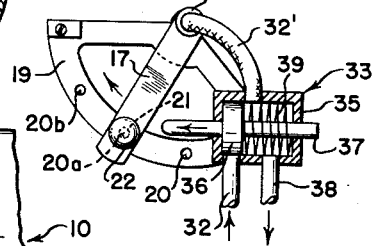
FIG. 5
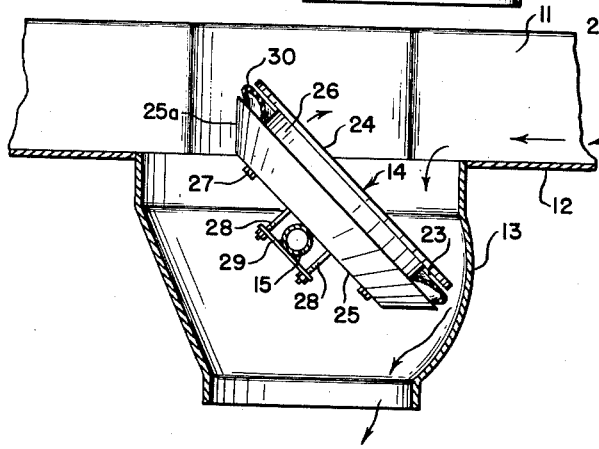
INVENTOR
Robert A. Sneddon
BY
ATTORNEYS

United States Patent Office 3,042,360
Patented July 3, 1962

3,042,360
VIBRATORY CONVEYOR DISCHARGE GATE
Robert A. Sneddon, Columbia Falls, Mont., assignor to Anaconda Aluminum Company, New York, N.Y., a corporation of Montana
Filed Oct. 25, 1957, Ser. No. 692,367
2 Claims. (Cl. 251—175)

This invention relates to vibratory conveyor discharge gates, and, more particularly, to an improved gate having pneumatic sealing means for closing a discharge opening in the floor of a vibratory conveyor channel member.

Vibratory conveyors are used for conveying powdered or granulated material. Such conveyors generally comprise one or a series of trough-like channel members, each vibrated rapidly in such manner as to cause unidirectional linear displacement of the material being conveyed lengthwise along the channels.

It is often advantageous to discharge material from such channels through openings in the channel floor, but it is very difficult to construct a closure gate for such discharge openings because under the intense vibration to which the channel is subjected they are not effective for maintaining the opening tightly closed at all times and hence they allow a certain amount of the conveyed material to leak through the opening. It is an object of the present invention to provide a discharge gate for an opening in the floor of a vibratory conveyor channel, which adequately seals the discharge opening and yet is designed as a relatively simple integral part of one of the vibrating elements of the conveyor. Moreover, the invention contemplates a gate having a seal which is adapted to be easily released as the gate is opened and to be equally easily reactivated as the gate is closed, thus permitting rapid and easy opening and closing of the gate.

The apparatus of the invention comprises a vibrating channel member having a discharge opening formed in its floor. The gate by which such opening may be closed comprises a closure member which is mounted for movement between a closed position in which it substantially closes said discharge opening except for a peripheral aperture, and an open position in which it leaves said opening substantially unclosed. The closure member is formed with a peripheral channel the open side of which faces toward the peripheral aperture about the closure member when the latter is in its closed position in the discharge opening. An inflatable extensible bladder which surrounds the closure member is mounted in said peripheral channel, and means including a source of compressed air is provided for inflating the bladder when the closure member is in its closed position. When inflated, the bladder is extended through the open side of the channel into the peripheral aperture about the closure member against the sides of the discharge opening and thus tightly seals the opening. Preferably the bladder is inflated and deflated by means of a valve which is operated by, or at least simultaneously with, the gate closure lever or other means by which the gate is moved to and from its closed position. Thereby closure (or opening) of the gate and inflation (or deflation) of the bladder is effected by a single operation.

A preferred embodiment of the discharge gate of this invention is described in detail below with reference to the accompanying drawings, wherein FIG. 1 is a plan, with parts broken away, of the new discharge gate in closed position in a vibratory conveyor channel member;

FIG. 2 is a section taken substantially along the line 2—2 of FIG. 1;

FIG. 3 is a view similar to FIG. 2 but showing the discharge gate in open position;

FIG. 4 is an elevation, partly in section, of the control valve in a position corresponding to the closed position of the discharge gate; and FIG. 5 is a view similar to FIG. 4 showing the control valve in a position corresponding to the open position of the discharge gate.

Referring first to FIG. 1, the channel member 10 of the conveyor includes side walls 11 and a bottom wall 12 (and may be provided with a cover, not shown). Each end of the channel element 10 is broken away in the drawing though it is to be understood that means are included to support and to vibrate the entire structure shown in the manner customary for vibratory conveyors.

A discharge duct 13 of approximately circular cross section is secured to the bottom wall 12 of the channel member and is of somewhat greater diameter than the width of the channel at the point where it joins the channel. Hence, the channel side walls 11 are bowed slightly outwardly at the point where the discharge duct 13 is located to accommodate its greater width. A circular closure gate 14 is positioned in the discharge opening defined by the upper end of the duct 13, and is secured to a rotatable hollow pivot shaft 15 which is arranged substantially parallel to a diameter of the gate 14. With the gate 14 in closed position as shown in FIGS. 1 and 2, the material carried by the conveyor proceeds along the bottom wall 12 of the channel element 10 and across the upper surface of the gate as indicated by the arrows in FIG. 2.

Located on either side of the channel element 10 are journals 16 and 16' in which the shaft 15 is supported. A gate control lever 17 for both closing and opening the gate is secured to one end of the shaft 15 where it projects beyond the journal 16. A handle 18 is attached to the control lever 17 so that the shaft 15 may be turned as desired to serving the gate 14 on the axis of the shaft to or from its closed position in the discharge opening. As seen in FIGS. 1, 4 and 5, an arcuate control lever positioning member 19 is mounted on the channel member 10 in a position conforming to the arc of travel of the handle 18 and is provided with a number of detent holes 20, 20a, 20b in its periphery (three such holes are indicated in the drawings). A slidable pin 21 extends axially through the handle 18 of the control lever so that it may be engaged in or disengaged from any of the detent holes by means of a knob 22. The lever 17, and thereby the closure gate 14, may be locked in any preselected angular position relative to the channel 10 by simply pressing in on the knob 22 to insert the pin 21 in one of the holes 20, 20a, or 20b. Advantageously, a spring (not shown) may be provided to urge the pin at all times toward the positioning member and into the detent holes.

Referring to FIGS. 2 and 3, it will be seen that the closure gate 14 is composed of plates which define an annular channel 23. The upper and lower plates 24 and 25 respectively of the gate are secured together, and to a short cylindrical member 26 of less diameter than the plates, by bolts 27. The lower plate 25 is rigidly attached to the hollow pivot shaft 15 by bolts 28 passing through a strap 29 which is welded to the shaft. An inflatable extensible annular bladder 30 is positioned within the annular channel 23 about the periphery of the lid, which channel is defined by the lower peripheral surface of the upper plate 24, the outer surface of the cylindrical member 26, and the upper surface of an upwardly flaring peripheral conical portion 25a of the bottom plate 25. The diameter of the plates 24 and 25 is a little less than that of the opening defined by the upper end of the duct 13, so that when the gate is in the closed position a peripheral aperture 31 remains between it and the wall of the duct. The conical portion 25a of the lower plate approaches but does not reach the lower edge of the upper plate 24, so that the open side of the channel faces toward the peripheral aperture 31 about the edge of the gate when the gate is in the closed position.

The bladder 30 may advantageously be a conventional pneumatic inner tube of the sort employed in vehicle tires, and is supplied with compressed air (by which it is inflated) from a compressed source through an air line 32, a control valve 33, a second compressed air line 32′, the hollow pivot shaft 15, and a branch pipe 34 connecting the hollow shaft to the bladder. When the bladder 30 is inflated with the gate in the closed position, as illustrated in FIG. 2, a circumferential portion of the bladder is extended through the open side of the channel 23 around the entire periphery of the gate 14 into the peripheral aperture 31. The bladder then presses tightly against the wall of the duct 13 and thereby completely seals the discharge opening.

The valve 33, shown in detail in FIGS. 4 and 5, is arranged to inflate the bladder 30 only when the gate 14 is swung to its closed position. To this end the valve 33 is mounted on the control lever position member 19. The valve comprises a cylinder 35 in which a piston 36 is mounted. The piston is affixed to a slidable piston rod 37 extending through each end of the cylinder. Compressed air is admitted from the line 32 to the interior of the cylinder through a port at one end of the cylinder wall. A second port at the opposite end communicates with an exhaust line 38 open to the atmosphere. The compressed air line 32′ connected to the hollow pivot shaft communicates with the cylinder through a third port located midway between the other two in the cylinder wall. The piston 36 permits communication of the conduit 32′ with either the compressed air source or with the exhaust line 38 depending on its position in the cylinder 35. A compression spring 39 is located about the piston rod 37 within the cylinder to urge the piston 36 to the position in which it shuts off the supply of compressed air and allows the bladder to exhaust the atmosphere.

The valve 33 is positioned so that the control lever 17 forces the piston rod 37 to the right, as illustrated in FIG. 4, to connect the bladder with the source of compressed air, when the discharge gate is swung to its closed position. When the control lever is moved in the reverse direction, to a position as shown in FIG. 5, to open the discharge gate, it will no longer abut the end of the piston rod 37, and the spring 39 will then force the piston 36 to the left, shutting off the supply of compressed air from the bladder and deflating it to the atmosphere.

In operation, with the discharge gate in the closed position shown in FIG. 2, the bladder 30 is inflated and is forced through the open side of the channel 23 into the peripheral aperture 31 to seal the discharge opening. When it is desired to divert material from the conveyor channel 10 into the discharge duct 13, the gate 14 is turned clockwise to a position as shown in FIG. 3. This is accomplished by pulling outwardly on the knob 22 to unlock the control lever 17, swinging the control lever to the position shown in FIG. 5, and again locking it in position by inserting the pin 21 into the next detent hole 20a. To open the gate wider, the lever is swung enough farther to permit inserting the pin in the last detent hole 20b. When the gate is first moved from its closed position, the piston rod 37 is released by the control lever and the spring 39 moves the valve piston 36 to the position in which the compressed air is shut off and the bladder is deflated. Hence, the gate is automatically unsealed as the first step in opening it. Once it is opened the conveyed material is diverted into the duct 13 as indicated by the arrows in FIG. 3.

When it is desired to close the discharge opening, the gate is returned to the closed position shown in FIG. 2. This is done simply by unlocking the control arm 17 and pivoting it counterclockwise back to the position of FIG. 4. As it comes to the end of its arcuate path of travel, the control lever engages the piston rod 37 and moves it to the position in which the exhaust port is closed and compressed air is admitted from the source through the lines 32 and 32′ to inflate the bladder 30. The circumferential portion of the bladder 30 thereby is extended through the open side of the channel 23 and the discharge opening is again sealed tightly. All conveyed material moving through the conveyor then passes over the gate 14; and because of the tight resilient seal effected by the bladder 30, none of the material penetrates through the gate opening despite the intense vibration to which it is subjected.

An important advantage of the new resiliently sealed gate is that it can always be closed tightly. It cannot be wedged partly open and caused to leak, when it is supposed to be closed, by granular material becoming wedged between the gate and its seat, for the resilient pneumatic bladder envelops such granules as may be caught between it and the duct 13 and forms a tight seal around them.

I claim:

1. A discharge gate for a substantially circular discharge opening in the floor of a vibratory conveyor channel member comprising a substantially circular closure plate of diameter somewhat less than the discharge opening, a cylindrical member of less diameter than said closure plate centrally secured to the bottom of said closure plate, a bottom plate formed with a conical annular surface secured to the lower end of said cylindrical member, the conical surface of the bottom plate forming with the outer surface of the cylindrical member and with the marginal portion of the lower surface of the closure plate an annular channel having its open side facing outwardly from the closure plate, an annular tubular extensible bladder positioned in said channel, a pivot shaft secured to said gate, a closure lever secured to said gate for swinging it on said pivot shaft between a closed position in which it is disposed substantially centrally in and inclosing relation with said discharge opening and an open position in which it leaves said discharge opening substantially unclosed, a source of compressed air, a valve through which said bladder is connected selectively to said compressed air source and to the atmosphere, and a valve operating member positioned for actuation by said closure lever to connect the bladder to the compressed air source and to the atmosphere respectively as the closure plate is moved to and from its closed position, whereby when the closure plate is in said closed position the bladder is inflated and extended through the open face of the channel in which it is mounted to completely close the marginal portion of the discharge opening and when the closure plate is moved from its closed position the bladder is deflated and withdrawn into said channel.

2. A discharge gate for a discharge opening in the floor of a vibratory conveyor channel member comprising a duct section extending from said opening, a substantially circular closure plate of a diameter somewhat less than the discharge opening, a cylindrical member of less diameter than said closure plate secured to the bottom of said closure plate, a bottom plate formed with a conical annular surface secured to the lower end of said cylindrical member, the conical surface of the bottom plate forming with the outer surface of the cylindrical member and with a marginal portion of the lower surface of the closure plate an annular channel having its open side facing outwardly from the closure plate, said closure plate and cylindrical member being pivotable about an axis offset from the plane of said opening, said closure plate and cylindrical member being movable between a closed position within said duct section in which it substantially closes said discharge opening except for a peripheral aperture and an open position in which it leaves said opening substantially unclosed, an inflatable annular tubular bladder continuously positioned in said channel, a source of compressed air, valve means for selectively connecting said bladder to said source of compressed air and means for operating said valve means for inflating said bladder when the closure plate and cylindrical member is in the closed position, thereby to force a peripheral portion of said bladder into said peripheral aperture and thus to fully close said discharge opening.

References Cited in the file of this patent

UNITED STATES PATENTS

| | | |
|---|---|---|
| 1,834,870 | Rogers | Dec. 1, 1931 |
| 1,839,092 | Feldmeir | Dec. 29, 1931 |
| 2,081,842 | Sharp | May 25, 1937 |
| 2,240,049 | Murphy | Apr. 29, 1941 |
| 2,386,717 | Sample | Oct. 9, 1945 |
| 2,567,032 | Schmidt | Sept. 4, 1951 |
| 2,705,016 | Saar | Mar. 29, 1955 |
| 2,853,266 | Raleigh | Sept. 23, 1958 |
| 2,889,963 | Johnson | June 9, 1959 |

FOREIGN PATENTS

| | | |
|---|---|---|
| 503,293 | Germany | July 26, 1930 |
| 444,841 | Great Britain | Mar. 30, 1936 |